June 24, 1958    L. WALSH    2,839,983
ROTATABLE DISC MOLD BOARD PLOW
Filed Feb. 7, 1955    2 Sheets-Sheet 1
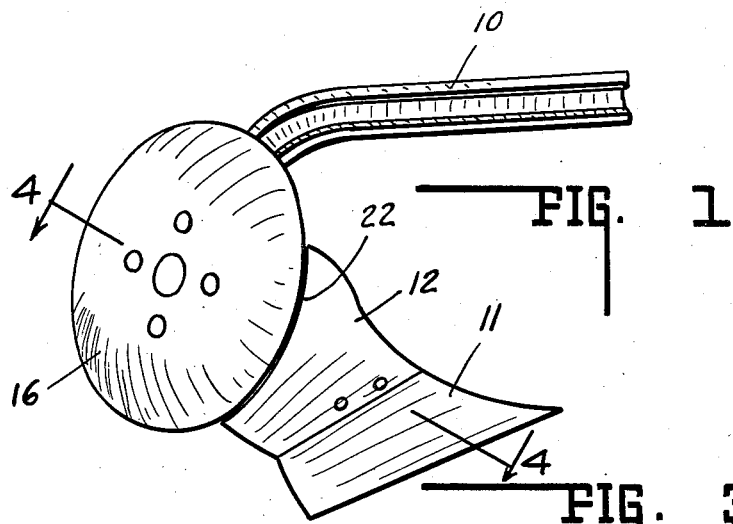
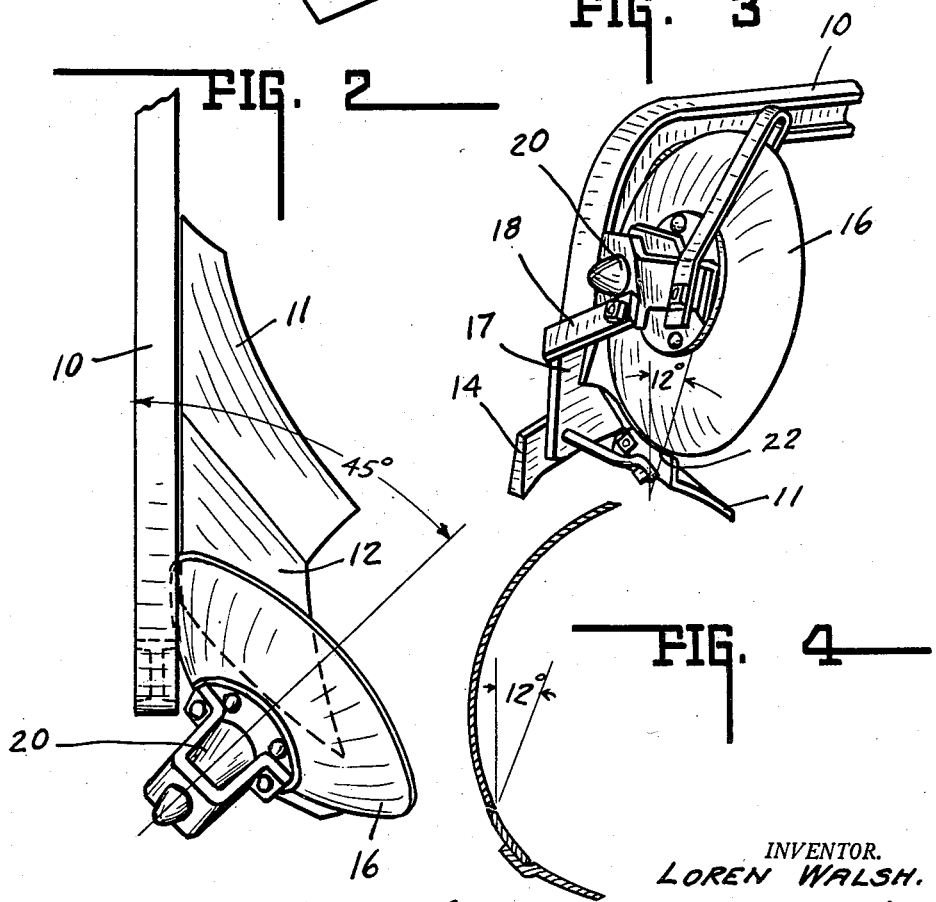
INVENTOR.
LOREN WALSH.
Lockwood, Galt, Woodard & Smith
ATTORNEYS.

June 24, 1958 L. WALSH 2,839,983
ROTATABLE DISC MOLD BOARD PLOW
Filed Feb. 7, 1955 2 Sheets-Sheet 2
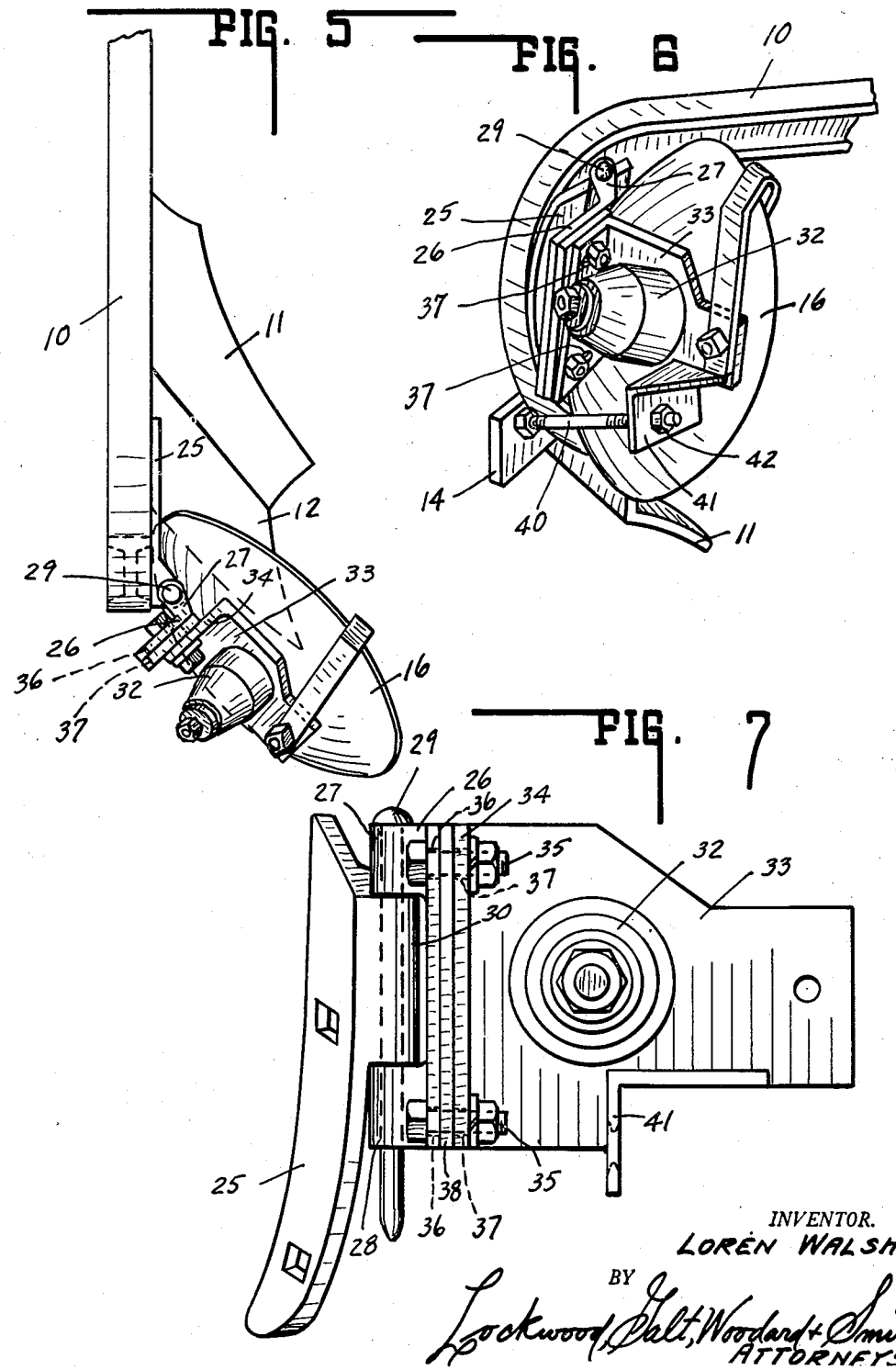
INVENTOR.
LOREN WALSH.
BY
Lockwood, Galt, Woodard & Smith
ATTORNEYS

United States Patent Office 2,839,983
Patented June 24, 1958

2,839,983
ROTATABLE DISC MOLD BOARD PLOW

Loren Walsh, Noblesville, Ind., assignor of one-third to Bert E. Teal, Indianapolis, and one-third to Sarrah L. Collins, Noblesville, Ind.

Application February 7, 1955, Serial No. 486,555

5 Claims. (Cl. 97—121)

This invention relates generally to mold board plows for agricultural use, and more particularly it relates to a combination of mold board and rotating disc plow.

This application is a continuation-in-part of my application, Serial No. 427,014, filed May 3, 1954 (now abandoned), for Rotatable Disc Mold Board Plow.

The conventional mold board plow comprises a beam having a plowshare adapted to cut a furrow and a mold board adapted to lift and turn a furrow. Present day mold board plows, which are utilized with motor operated tractors, have relatively long and wide mold boards which tend to create a great deal of friction and create a relatively heavy load. Consequently, to haul a two bottom or three bottom plow of the conventional mold board type a very powerful tractor is required.

The conventional mold board plow functions to cut and turn a furrow, but it has no mechanism which can act in a positive manner to break up the soil as the furrow is turned. The only breaking action which can occur is that resulting as the furrow falls and turns from the rear end of the mold board. If the soil is light in character, it tends to break up to a certain extent, but heavier soils do not break up to any useful degree and, consequently, a field plowed by a conventional mold board plow has multiple rows of unbroken furrows. Accordingly, the soil must be worked by disc harrows or other types of harrows to reduce the furrows to pulverized soil. Furthermore, a reasonable degree of pulverization requires repeated treatment by disc harrows and/or spring tooth harrows, as well as cultipactors or other pulverizing machines.

Accordingly, the principal object of the invention is to provide a mold board plow adapted to reduce friction effects and thereby reduce the pulling effort required of a tractor.

Another object of this invention is to provide a mold board plow which includes apparatus adapted to break up the soil in a furrow as the furrow is turned.

Still another object of this invention is to provide a rotatable mold board plow having apparatus adapted to adjust and predetermine the degree to which the soil is broken up as a furrow is turned.

In accordance with this invention there is provided a mold board plow comprising a beam, a share mounted at the lower extremity of said beam, a partial mold board mounted on said beam above said share for lifting a furrow above ground level, and a rotatable disc forming an extension of said share and mounted on said beam at an angle approximately forty-five degrees horizontally and twelve degrees vertically to turn and berak up a furrow as it moves upwardly from said mold board and across the lower portion of said disc.

Further in accordance with this invention there is provided a mold board plow comprising a beam, a share mounted at the lower extremity of said beam, a partial mold board mounted on said beam above said share for lifting a furrow above ground level, a rotatable disc forming an extension of said share and means mounted on said beam for supporting said rotatable disc and adjusting the angle between said beam and said disc to vary the degree to which the soil in a furrow is broken up as the furrow is turned.

The full nature of the invention will be understood from the accompanying drawings and the following description and claims:

Fig. 1 is a side elevation view of the mold board plow provided in accordance with this invention.

Fig. 2 is a top plan view of the structure illustrated in Fig. 1.

Fig. 3 is a rear elevation view of the structure shown in Fig. 1.

Fig. 4 is a cross section taken on line 4—4 of Fig. 1.

Fig. 5 is a top plan view of a modification of this invention.

Fig. 6 is a rear perspective view of the modification shown in Fig. 5.

Fig. 7 is a front elevation of the disc supporting hinge illustrated in Figs. 5 and 6.

Referring to the drawings, this invention comprises a mold board plow having a conventional beam 10 which curves downwardly and forwardly to support in conventional manner a plowshare 11 of conventional form and a partial mold board 12. Also attached to the beam is a landside 14 which takes the side thrust of the plow on the vertical edge of the furrow.

A share 11 and mold board 12 serve to cut the soil in the form of a furrow and lift it up above normal ground level, which would be indicated usually by the top edge of the landside 14. For turning the furrow through an angle of approximately one hundred and eighty degrees and breaking the soil into relatively small pieces, there is provided a rotatable, concave disc 16 mounted on the beam 10 by means of a plate 17 and a strut 18. A bearing structure generally indicated at 20 is attached to the outer end of strut 18 and rotatably supports the disc 16 at an angle of approximately forty-five degrees to the longitudinal axis of the beam 10 and also at an angle of approximately twelve degrees with respect to the vertical plane of the beam 10. Preferably, the lower periphery of the disc 16 is on a level with the top of landside 14 or slightly above the same.

In action the share 11 and mold board 12 cut and raise a furrow up to about ground level or a little above. In order to continue the rising and turning action of the furrow, disc 16 has a curvature and is mounted at the proper angle so that there is a continuous curvature on the section line 4—4, for example, of Fig. 1 as illustrated in Fig. 4. Also, the edge 22 of mold board 12 is curved to fit the curvature of disc 16 whereby a furrow may pass along the surface of mold board 12 onto the surface of disc 16 without any tendency to ball up at the junction point which is edge 22.

As the soil in the furrow contacts disc 16, it causes the disc to rotate in a clockwise direction (Fig. 1) whereby the friction on this portion of the mold board is greatly reduced. In fact, it is believed that a major portion of the friction created by the furrow normally occurs on a conventional mold board at the point where the furrow is lifted and turned. Thus, the disc takes the place of this portion of the mold board and presents a moving surface, thereby to reduce friction. Field tests using a hydraulic draft meter between the tractor and the three-bottom conventional mold board plow shows in light soil that a draft of twenty-eight to thirty-five hundred pounds is required. Using the plow as provided in accordance with this invention a draft pull of fourteen hundred to twenty-four hundred pounds is required in light soil. In heavy soil a conventional mold board plow requires a draft pull of forty-one hundred to five thousand pounds, while the plow as described herein requires a draft pull of thirty-two hundred to thirty-six hundred pounds. Thus, there is a reduction in load or draft pull of approximately thirty percent where the disc 16 is incorporated in place of a rear or high end of a conventional mold board.

The field tests also show that even in excessively wet, heavy soil the turning action of the disc breaks up the soil in the furrow to such an extent that a field plowed with this plow shows no evidence of furrow structure. On the average, the soil is broken up into lumps having a maximum size of a walnut.

It is believed that this action results from the fact that the soil travels along the lower half of the disc 16 and as it leaves the surface of the disc, the disc has an upward motion which tends to tear the soil, breaking it up into relatively small lumps.

From the foregoing description it will be apparent that the plow constructed in accordance with this invention has the double advantage of reducing draft load to a very substantial degree and also breaks the soil into relatively small lumps, thereby reducing the harrowing process by a substantial degree. For example, where it might be necessary to make four applications of a harrow to a field which has been plowed with a conventional mold board plow, use of this invention makes it possible to obtain the same results with only two or three applications of a disc harrow.

While this invention has proved highly satisfactory and efficient with the disc 16 disposed at an angle of forty-five degrees to the longitudinal axis of the beam and at an angle of twelve degrees with respect to the vertical plane of the beam, it will readily be appreciated that these angles may be varied to some extent. For example, the disc 16 may be supported at an angle with respect to the longitudinal axis of the beam varying between thirty-seven degrees and fifty-three degrees, while the angle of the disc to the vertical plane of the beam may be varied from zero degrees to twenty degrees.

Experimental use of this invention shows that it is desirable to provide a readily adjustable supporting structure for the disc 16. The purpose of this adjustment is to arrange the disc at a relatively sharp angle to the direction of travel of the plow for the purpose of breaking the soil into relatively fine particles or for arranging the disc at a relatively slight angle to the direction of movement of the plow for the purpose of breaking up the soil into relatively large lumps. For fall plowing it is desirable to leave the soil in rather large lumps so that it may be well aerated and will not be packed by rain and snow. For spring plowing the disc may be adjusted to the relatively sharp angle for breaking the soil into relatively small particles, thereby eliminating several harrowing operations.

The adjustable support for disc 16 comprises a hinge, one wing 25 of which may be secured in any suitable manner to the beam 10. The hinge comprises a second wing 26 having pin receiving members 27 and 28 through which pin 29 may be inserted for operative engagement with the pin receiving member 30 of wing 25.

The disc 16 may be supported in a bearing housing 32 mounted on a bracket 33 having a right angle flange 34 adapted to be secured to the wing 26 of the hinge by means of a pair of bolts 35. The disc is, therefore, adjustable on the hinge through a horizontal angle which may be changed to alter the degree of breaking up of the soil.

When the disc 16 is adjusted on the hinge, it also has to be adjusted to maintain the leading edge of the disc in approximate alignment with the leading edge of the mold board 12. In order to provide such adjustment, the wing 26 of the hinge and the right angle flange 34 of bracket 33 is provided with elongated slots 36 and 37, respectively, for accommodating the bolts 35 in such a manner that they may be loosened to permit movement of the disc through a vertical angle and also movement of the disc toward and away from the mold board 12, whereby the leading edge of the disc may be brought into substantial alignment with the leading edge of the mold board.

For providing further adjustment of the disc 16 to bring it into substantial alignment with the leading edge of the mold board 12, a spacer member 38 may be interposed between the wing 26 and the flange 34. This has the effect of moving the disc rearwardly of the mold board 12 and is necessary when the disc is adjusted to a sharp angle with respect to the direction of movement of the plow. When the disc is moved to a relatively small angle relative to the direction of movement of the plow, it tends to move away from the leading edge of the mold board. For this adjustment the spacer 38 may be removed to bring the disc back into proper relation with the leading edge of the mold board.

For holding the angular adjustment of the disc when the disc is rotated on the hinge, there is provided a bracing member 40 fixed at one end to the landside 14 and at the other end to relatively projecting member 41 on the bracket 33. A pair of jam nuts 42 may be threaded on brace 40 for fixing it with respect to the member 41. Nuts 42 may be adjusted to change the angular relation of the disc.

From the foregoing description it will be apparent that this modification of the invention provides an adjustable support whereby the disc may be disposed at differing angles with respect to the plow beam and at the same time the disc is maintained in operative relation with the mold board 12 where the leading edge of the disc is maintained either in alignment with the mold board or in a position slightly behind the leading edge of the mold board. Without this type of adjustment the disc would project outwardly over the mold board, and soil sliding upwardly along the surface of the mold board would slip behind the disc, clogging and binding the disc, whereby it would be prevented from functioning in its intended manner. It should be noted that the disc is adjustable through a horizontal angle, a vertical angle, linearly toward and away from the leading edge of the mold board and also linearly inwardly and outwardly of the mold board.

The invention claimed is:

1. A plow comprising a beam having a bowed portion and a foot portion, a landside and a share assembly mounted on the foot portion of said beam, a hinge mounted on the bowed portion of said beam, a bracket mounted on said hinge, said bracket including bolt-receiving elongated slots permitting movement of said bracket through a vertical angle with respect to said beam, means coupled between said bracket and said land side for holding said hinge in an adjusted position, a concave disc rotatably mounted on said bracket and being disposed to the rear of said share and at a height such that the lower periphery thereof is slightly above the upper edge of said landside, a mold board between said share and said disc formed to provide a soil elevating surface extending between said share and a substantial portion of said disc, and spacer means mounted between said hinge and said bracket for adjustably positioning said disc with respect to said mold board.

2. A plow comprising a beam having a bowed portion and a foot portion, a landside and a share assembly mounted on the foot portion of said beam, a hinge mounted on the bowed portion of said beam, means operatively associated with said hinge and said beam for holding said hinge in an adjusted position, a bracket mounted on said hinge, said bracket including bolt-receiving elongated slots permitting movement of said bracket through a vertical angle with respect to said beam, a concave disc rotatably mounted on said bracket and being disposed to the rear of said share, a mold board between said share and said disc formed to provide a soil elevating surface extending between said share and a substantial portion of said disc, and spacer means mounted between said hinge and said bracket for adjustably positioning said disc with respect to said mold board.

3. A plow comprising a beam having a bowed portion and a foot portion, a landside and a share assembly mounted on the foot portion of said beam, a hinge mounted on the bowed portion of said beam for movement through a horizontal angle, means operatively associated with said hinge and said beam for holding said hinge in an adjusted position, a bracket, adjustable means for mounting said bracket on said hinge to permit movement of said bracket through a vertical angle with respect to said hinge, a disc rotatably mounted on said bracket and being disposed to the rear of said share, a mold board between said share and said disc formed to provide a soil elevating surface extending between said share and a substantial portion of said disc, and means mounted between said hinge and said bracket for adjustably positioning said disc toward or away from said mold board.

4. A plow comprising a beam having a bowed portion and a foot portion, a landside and a share assembly mounted on the foot portion of said beam, a hinge mounted on the bowed portion of said beam for movement through an angle in one plane, means operatively associated with said hinge and said beam for holding said hinge in an adjusted position, a bracket, adjustable means for mounting said bracket on said hinge to permit movement of said bracket through an angle in a plane normal to said one plane, a disc rotatably mounted on said bracket and being disposed to the rear of said share, a mold board between said share and said disc formed to provide a soil elevating surface extending between said share and a substantial portion of said disc, and means operatively associated with said hinge and said bracket for adjustably moving said disc linearly toward or away from said mold board.

5. A plow comprising a beam having a bowed portion and a foot portion, a landside and a share assembly mounted on the foot portion of said beam, an adjustable support mounted on the bowed portion of said beam for movement through an angle in one plane, means operatively associated with said adjustable support and said beam for holding said support in an adjusted position, a bracket, a disc rotatably mounted on said bracket and being disposed to the rear of said share, adjustable means for mounting said bracket on said support to permit movement of the rotational axis of said disc through an angle in a plane normal to said one plane, a mold board between said share and said disc formed to provide a soil elevating surface extending between said share and a substantial portion of said disc, and means operatively associated with said support and said bracket for adjustably moving said disc linearly and longitudinally toward or away from said mold board.

References Cited in the file of this patent

UNITED STATES PATENTS

| | | |
|---|---|---|
| 113,760 | Godfrey | Apr. 18, 1871 |
| 114,002 | Godfrey | Apr. 25, 1871 |
| 549,827 | Sevier | Nov. 12, 1895 |
| 991,452 | Park | May 2, 1911 |
| 1,328,800 | Sherrod | Jan. 20, 1920 |
| 1,621,772 | Ellenburg | Mar. 22, 1927 |
| 1,736,442 | Hill | Nov. 19, 1929 |
| 2,757,593 | Bowman | Aug. 7, 1956 |